(12) United States Patent
Carley et al.

(10) Patent No.: US 12,514,393 B2
(45) Date of Patent: Jan. 6, 2026

(54) CAPSULE HOLDERS FOR BEVERAGE DISPENSING APPARATUS

(71) Applicant: BARTESIAN CORP., Chicago, IL (US)

(72) Inventors: Matthew T. Carley, Richmond, VA (US); Ben H. Branson, III, Mechanicsville, VA (US); Ernie Pryor, Chicago, IL (US); Ryan Close, Kitchener (CA)

(73) Assignee: BARTESIAN CORP., Chicago, IL (US)

(*) Notice: Subject to any disclaimer, the term of this patent is extended or adjusted under 35 U.S.C. 154(b) by 837 days.

(21) Appl. No.: 17/835,685

(22) Filed: Jun. 8, 2022

(65) Prior Publication Data
US 2023/0397753 A1 Dec. 14, 2023

(51) Int. Cl.
*A47J 31/36* (2006.01)
*A47J 31/40* (2006.01)

(52) U.S. Cl.
CPC ......... *A47J 31/407* (2013.01); *A47J 31/3676* (2013.01); *A47J 31/3695* (2013.01)

(58) Field of Classification Search
CPC ................ A47J 31/3628; A47J 31/3695; A47J 31/3676; A47J 31/369; A47J 31/407
USPC .......................................................... 99/295
See application file for complete search history.

(56) References Cited

U.S. PATENT DOCUMENTS

| | | | | |
|---|---|---|---|---|
| 2001/0052294 | A1* | 12/2001 | Schmed | A47J 31/3628 99/302 R |
| 2006/0107841 | A1* | 5/2006 | Schifferle | A47J 31/0668 99/279 |
| 2008/0245236 | A1 | 10/2008 | Ternite et al. | |
| 2009/0126577 | A1 | 5/2009 | Ternite | |
| 2015/0201790 | A1* | 7/2015 | Smith | A47J 31/3695 426/431 |
| 2019/0290053 | A1* | 9/2019 | MacLean | A47J 31/3628 |

* cited by examiner

*Primary Examiner* — Reginald Alexander
(74) *Attorney, Agent, or Firm* — Perry + Currier Inc.

(57) ABSTRACT

A capsule holder for a beverage dispensing apparatus includes: a base having a lower wall defining an open chamber configured to receive a beverage capsule; an extractor extending from the lower wall into the chamber and configured to pierce the beverage capsule; a carriage having a ledge configured to engage with a perimeter flange of the capsule, the carriage movably coupled to the base between (i) a lowered position to place the capsule at a first depth in the chamber for piercing of the capsule by the extractor, and (ii) a raised position to place the capsule at a second depth smaller than the first depth, and substantially withdraw the extractor from the capsule; and a biasing element configured to bias the carriage toward the raised position.

11 Claims, 7 Drawing Sheets

CAPSULE HOLDERS FOR BEVERAGE DISPENSING APPARATUS

BACKGROUND

Beverage dispensing devices accept capsules containing various flavoring and/or coloring materials (e.g., powders, liquids, and the like). To produce a beverage, a dispensing apparatus is generally configured to inject fluid (e.g., water, spirits, or the like) into a capsule, mixing the fluid with the materials in the capsule, and to extract the mixed fluid from the capsule. The spent capsule is then removed from the dispensing apparatus. Removal of spent capsules, however, can lead to accidental damage to or removal of other components of the dispensing apparatus.

SUMMARY

An aspect of the specification provides a capsule holder for a beverage dispensing apparatus, the capsule holder comprising: a base having a lower wall defining an open chamber configured to receive a beverage capsule; an extractor extending from the lower wall into the chamber and configured to pierce the beverage capsule; a carriage having a ledge configured to engage with a perimeter flange of the capsule, the carriage movably coupled to the base between (i) a lowered position to place the capsule at a first depth in the chamber for piercing of the capsule by the extractor, and (ii) a raised position to place the capsule at a second depth smaller than the first depth, and substantially withdraw the extractor from the capsule; and a biasing element configured to bias the carriage toward the raised position.

BRIEF DESCRIPTIONS OF THE DRAWINGS

Embodiments are described with reference to the following figures.

DETAILED DESCRIPTION

Figure 1:
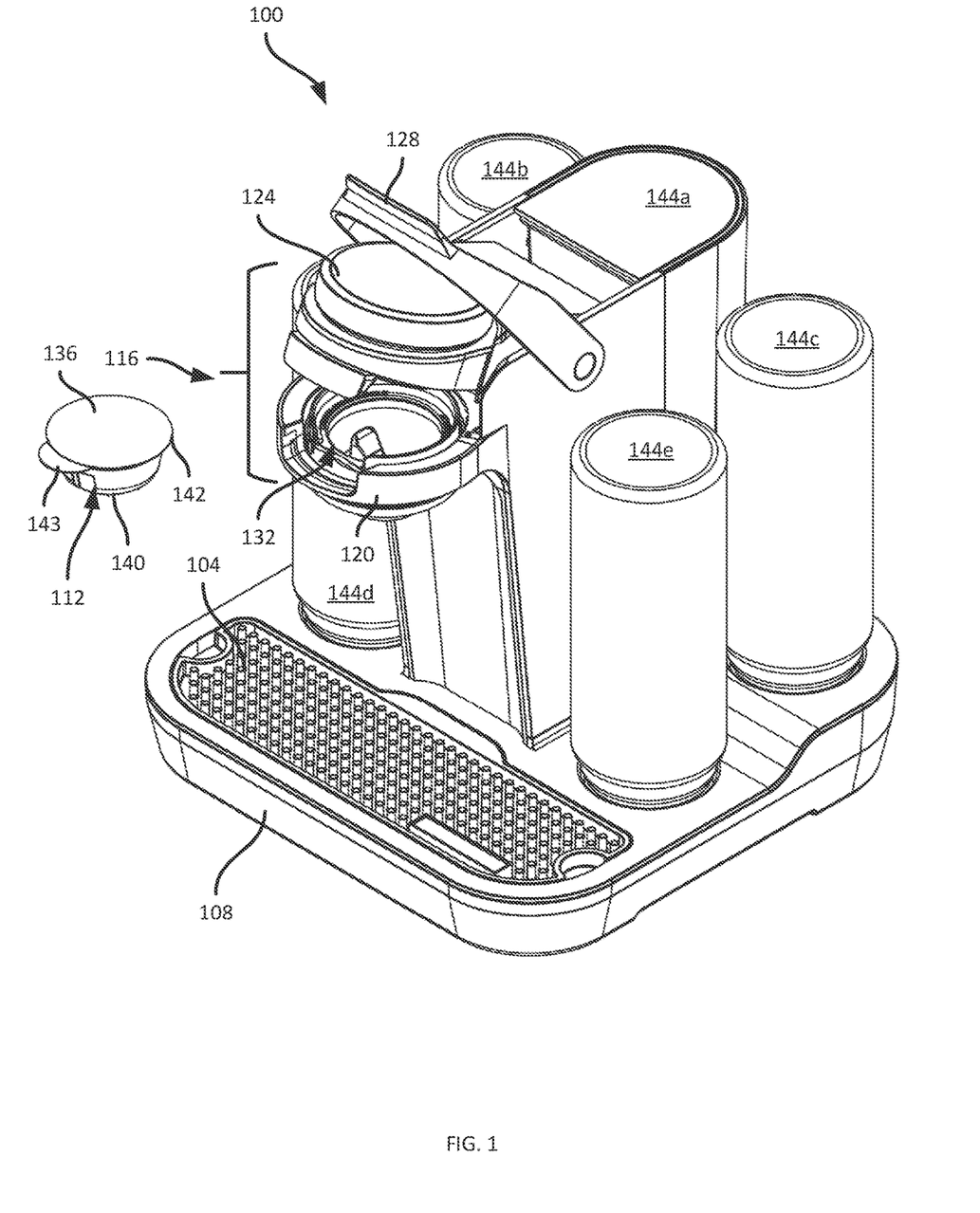
FIG. 1 is an isometric view of a beverage dispensing apparatus and a capsule for use in the beverage dispensing apparatus.

FIG. 1 depicts a beverage dispensing apparatus 100, also referred to herein as the dispensing apparatus 100 or simply the apparatus 100. The apparatus 100 enables the production of beverages, dispensed into a suitable receptacle (e.g., a glass, mug or the like) placed on a support surface 104 defined by a base 108 of the apparatus 100. The apparatus 100 produces a beverage via the placement of a capsule 112 (shown prior to insertion in the apparatus 100) into a dispensing head assembly 116 of the apparatus 100. The dispensing head 116, in the illustrated example, includes a fixed lower portion 120 (referred to as fixed as a result of being substantially immovable relative to a the base 108 of the apparatus 100), and a movable upper portion, or cover, 124, The cover 124 is movable between open position shown in FIG. 1, and a closed position, e.g., via manipulation of a handle 128.

The lower portion 120 of the dispensing head 116 supports a capsule holder 132. With the cover 124 in the open position, the capsule 112 can be inserted into the capsule holder 132. The cover 124 can then be closed, enclosing the capsule holder 132 and the capsule 112 between the cover 124 and the lower portion 120. Closure of the cover 124 also, as will be discussed below, pierces an upper wall 136 (e.g., a foil cover or the like) of the capsule 112 with an injector mounted to the cover 124, and pierces a lower wall 140 of the capsule 112 with an extractor mounted within the capsule holder 132. As shown in FIG. 1, the capsule 112 can include a flange 142 extending outwards at the upper wall 136. A portion of the flange 142 can be enlarged to form a tab 143, e.g., to facilitate handling of the capsule 112 for placement into the apparatus 100 and removal from the apparatus 100.

The apparatus 100 can then inject (via the injector mentioned above) fluid into the capsule 112, e.g., from any one or more of a set of reservoirs 144a, 144b, 144c, 144d, and 144e. For example, the reservoir 144a can contain water, while the reservoirs 144b through 144e can contain spirits. A wide variety of other fluids are also contemplated, however, and the number and placement of reservoirs 144 can also vary in other implementations. As will be apparent to those skilled in the art, fluid injected into the capsule 112 mixes with the materials contained within the capsule 112, and the mixed fluid exits the capsule 112 through the above-mentioned extractor, for dispensing into a receptacle placed on the support surface 104.

Figure 2:
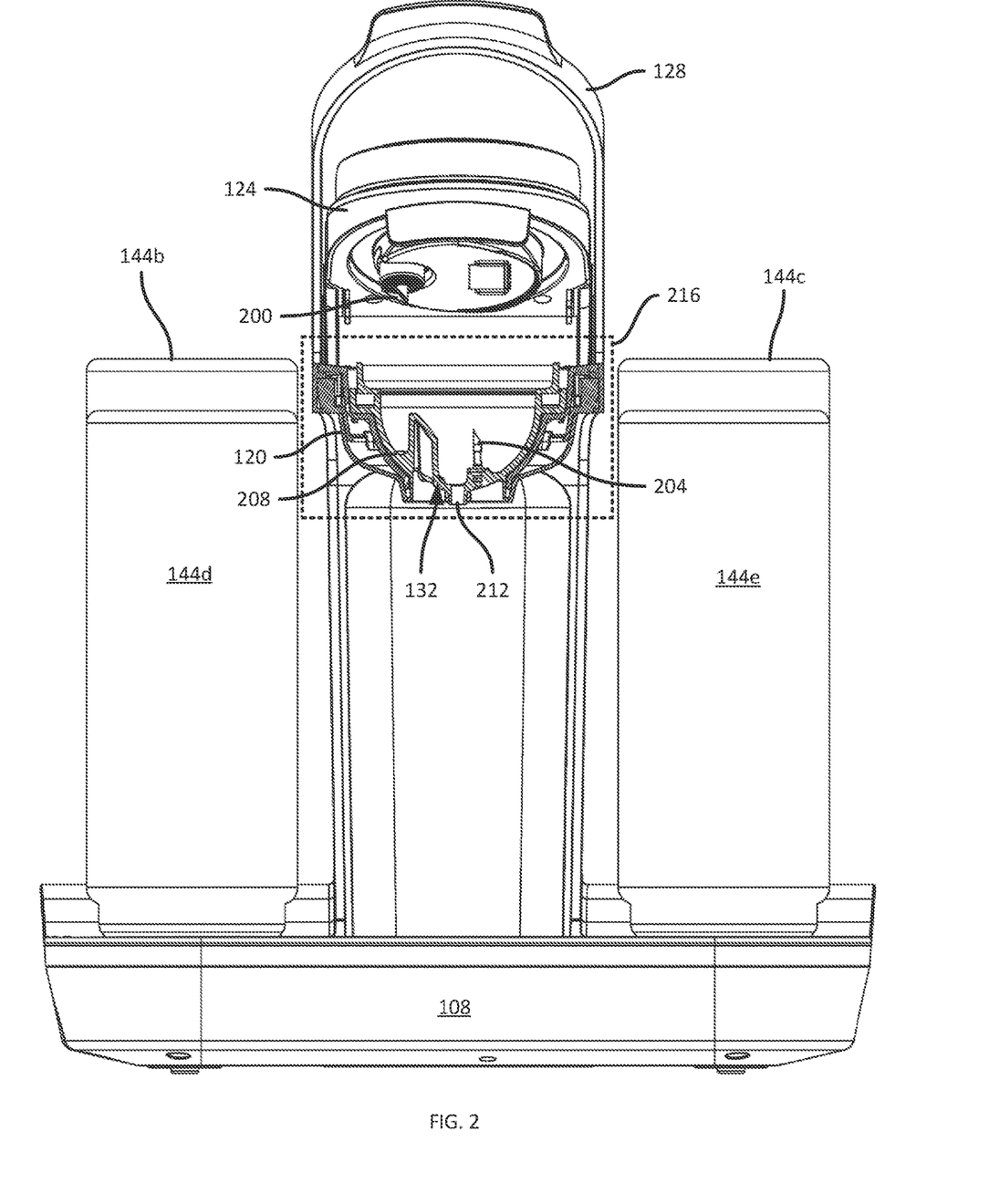
FIG. 2 is a front view of the beverage dispensing apparatus of FIG. 1, with a dispensing head assembly shown in partial cross section.

FIG. 2 illustrates a front view of the apparatus 100, with the lower portion 120 of the dispensing head 116, as well as the capsule holder 132, shown in cross section. As seen in FIG. 2, an injector 200 (e.g., a hollow needle) mounted to an underside of the cover 124 is configured to pierce the capsule 112 when the cover 124 is closed over the capsule 112. As also noted above, the capsule holder 132 includes an extractor 204 extending from a lower wall 208 thereof, as well as an outlet 212 defined in the lower wall 208, enabling mixed fluid to exit the capsule 112 and the capsule holder 132. In some examples, the extractor 204 itself can also define an outlet, e.g., in the form of an opening traversing the lower wall within the extractor 204.

As will now be apparent, piercing of the capsule 112 by the extractor 204 can result in the extractor 204 being frictionally retained within the opening in the lower wall 140 of the capsule 112 creating by such piercing. The capsule 112 is typically single-use, and therefore, following dispensing of the beverage, an operator of the apparatus 100 can remove the capsule 112 from the holder 132 to prepare the apparatus 100 for insertion of another capsule. The above-mentioned frictional retention of the extractor 204 in the capsule wall, however, may lead to the accidental removal of the capsule holder 132 with the spent capsule 112. The operator of the apparatus 100 may then need to remove the capsule holder 132 from the spent capsule 112 and replace the capsule holder 132 in the apparatus 100. In some instances, the operator may inadvertently discard of the capsule holder 132 with the spent capsule 112.

The above issue may be remedied by, for example, permanently affixing the capsule holder 132 to the lower portion 120. Affixing the capsule holder 132 to the lower portion 120, however, may impede cleaning and maintenance of the capsule holder 132. The apparatus 100, and the capsule holder 132 in particular, therefore include certain features discussed below that facilitate removal of a spent capsule 112 from the apparatus 100 while reducing the likelihood of inadvertent removal of the capsule holder 132, and also while retaining the ability to remove the capsule holder 132 for cleaning and/or maintenance.

FIG. 2 indicates a portion 216 of the apparatus 100, including part of the lower portion 120 of the dispensing head 116, and the capsule holder 132. The portion 216 is shown in greater detail, in isolation, in FIG. 3.

Figure 3:
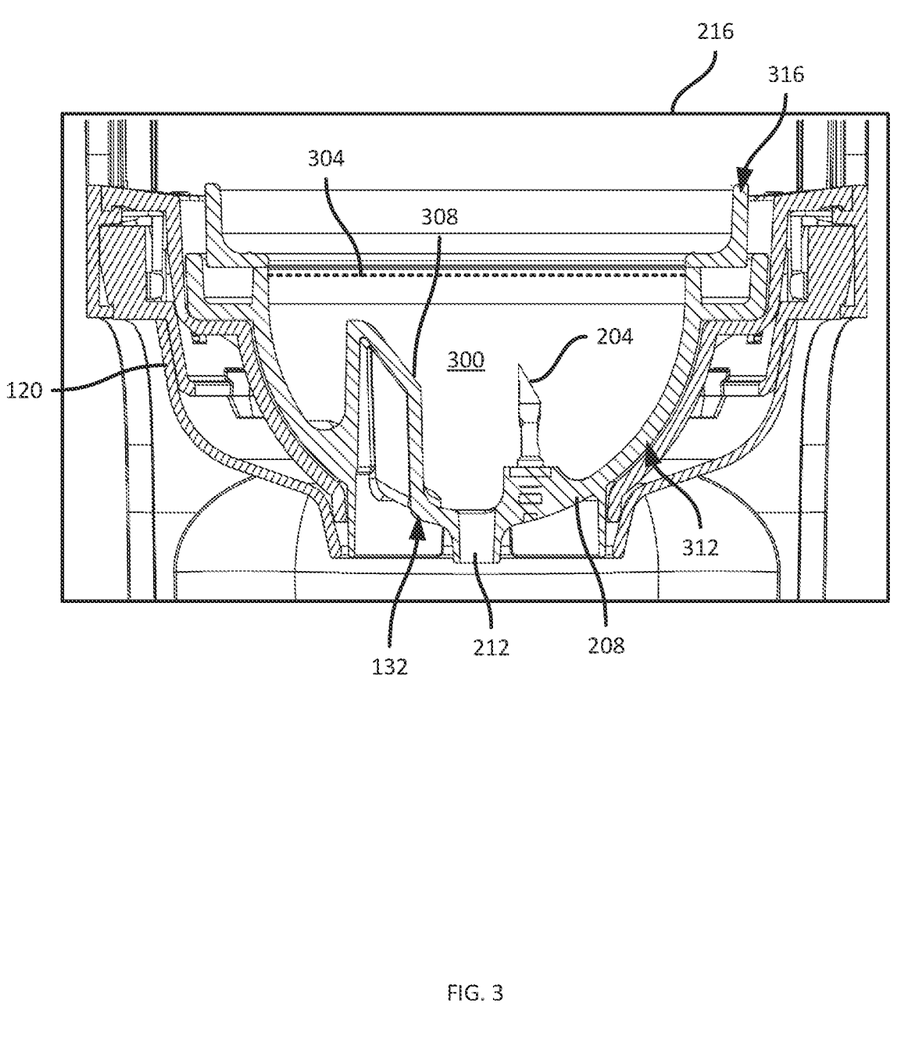
FIG. 3 is a detailed view of the cross section of FIG. 2.

As illustrated in FIG. 3, the capsule holder 132 is shown in its operational position within the lower portion 120. In addition to the extractor 204, the lower wall 208, and the outlet 212, certain additional features of the capsule holder 132 are shown in FIG. 3. In particular, The lower wall 208 defines an open chamber 300 within the capsule holder 132, into which the capsule 112 is placed. The extractor 204 extends into the chamber 300, substantially vertically in this example.

The chamber 300 includes an open end 304 indicated by a dashed line. The capsule 112, as will be apparent to those skilled in the art, is inserted into the capsule holder 132 at the open end 304, and during injection of fluid into the capsule 112, and extraction of mixed fluid from the capsule 112, the lower wall 140 of the capsule 112 engages with the lower wall 208 of the capsule holder 132. For example, the capsule 112 can rest on a guide feature 308 extending from the lower wall 208 into the chamber 300, e.g., to correctly locate and support the capsule 112 within the chamber 300.

The capsule holder 132 includes two distinct components, movable relative to one another. In particular, the capsule holder 132 as illustrated includes a base 312, and a carriage 316. When the capsule holder 132 is inserted into the lower portion 120 of the dispensing head assembly 116, the base 312 is supported by the walls of the lower portion 120. During operation of the apparatus 100, the base 312 is substantially static, i.e., motionless relative to the lower portion 120. The carriage 316, however, is movably coupled with the base 312, and moves relative to the base 312 between raised and lowered positions. As will be discussed in greater detail below, when the carriage 316 is in the raised position, the carriage 316 supports the capsule 112, e.g., by engaging with an underside of the flange 142 mentioned in connection with FIG. 1. Movement of the carriage 316 therefore also moves the capsule 112 into or out of the chamber 300, and as will be discussed below, enables the extractor 204 to pierce the capsule 112 in the lowered position and withdraws the extractor 204 from the capsule 112 in the raised position.

Figure 4:
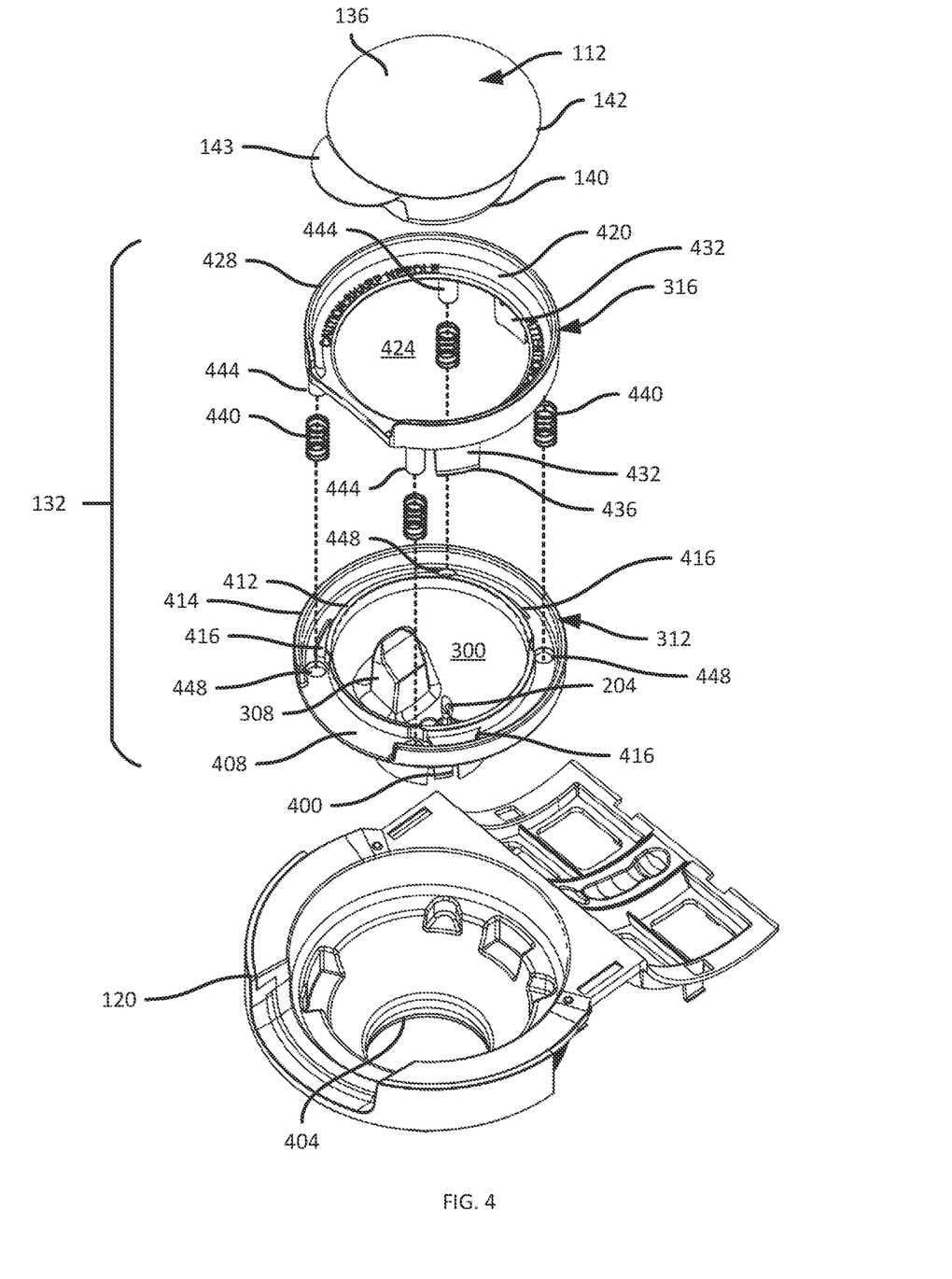
FIG. 4 is an exploded view of a capsule holder of the beverage dispensing apparatus of FIG. 1.

FIG. 4 illustrates an exploded view of the capsule holder 132 and the lower portion 120 of the dispensing head 116, illustrating certain features of the base 312 and the carriage 316 in greater detail.

The base 312 rests within the lower portion 120, and can include one or more flexible tabs 400 to engage with a collar 404 of the lower portion 120, e.g., to removably retain the base 312 within the lower portion 120. As will be apparent, the tab(s) 400 can be manipulated by an operator of the apparatus 100, e.g., by squeezing the tabs 400 inwards from below the collar 404 to release the base 312 from the lower portion 120. As will be apparent to those skilled in the art, in some cases the force exerted on the base 312 by withdrawal of the capsule 112 due to frictional engagement between the extractor 204 and the capsule 112 may exceed the force necessary to dislodge the tabs 404 inadvertently, however. Implementation of a multi-component capsule holder 132 as described herein facilitates separation of the capsule 112 from the extractor 204 while reducing or eliminating the application of force on the base 312 that may remove the base 312 from the lower portion 120.

The base 312 also includes a perimeter shoulder 408, which in the illustrated example has an annular shape, surrounding the open end 304 of the chamber 300. The shoulder 408 is substantially perpendicular the direction of insertion of the capsule 112, and therefore also to the orientation of the extractor 204. In this example, when in use the extractor 204 is substantially vertical, and the shoulder 408 is therefore substantially horizontal.

The base 312 also includes a wall 412 extending upwards (i.e., away from the chamber 300) from the shoulder 408. The wall 412, in this example, defines the open end 304 of the chamber 300. The base 312 can also include an outer wall 414. The carriage 316 is configured to engage with the wall 412 when the carriage 316 is in the lowered position. That is, the upper edge of the wall 412 determines the extent to which the carriage 316 can move in a first direction, towards the chamber 300. The shoulder 408 also includes at least one slot 416 (three are included in the illustrated example) that cooperates with a complementary component of the carriage 316 to determine the extent to which the carriage 316 can move in a second direction, away from the chamber 300.

The carriage 316 includes a ledge 420, e.g. parallel to the shoulder 408 mentioned above (e.g., horizontal in an operational state). The ledge 420 is annular in this example, and defines an opening 424 sized to accommodate the body of the capsule 112, with the exception of the flange 142. The flange 142 is instead configured to rest on the ledge 420 when the capsule 112 is placed into the capsule holder 132. An underside of the ledge 420 (opposite the visible surface of the ledge 420 in FIG. 4) is configured to rest on the wall 412 of the base 312, as discussed above, when the carriage 316 is in the lowered position. The carriage 316 can also include, as in the illustrated example, an outer wall 428 extending from a perimeter of the ledge 420, e.g., to guide placement of the capsule 112 on the ledge 420.

The carriage 316 includes additional components to movably couple the carriage 316 with the base 312. In particular, the carriage 316 includes one or more tabs 432, each configured to engage with a corresponding one of the slots 416 mentioned earlier. Specifically, the tabs 432 extend from the underside of the ledge 420 and are shaped to fit through the corresponding slots 416. Each tab 432 can include a stop or lip 436 or other protrusion, e.g., at a distal end thereof, to engage with an underside of the shoulder 408 and prevent withdrawal of the tab 432 from the slot 416. The tabs 432 can be sufficiently flexible, however, to permit deformation of the tabs 432 inwards, towards the opening 424, to disengage the lips 436 and allow withdrawal of the tabs 432 from the slots 416, e.g., to dean the carriage 316 separately from the base 312.

As will now be apparent, therefore, limits on the movement of the carriage 316 relative to the base 312 are defined by the wall 412, the slots 416, and the tabs 432. In particular, the furthest extent to which the carriage 316 can move towards the chamber 300 (e.g., downwards, in this example) is set by engagement of the underside of the ledge 420 with the wall 412. That extent therefore defines the lowered position of the carriage 316. The furthest extent to which the carriage 316 can move away from the chamber 300 (e.g., upwards, in this example) is set by engagement of the lips 436 with the underside of the shoulder 408, defining the raised position of the carriage 316.

As also illustrated in FIG. 4, the carriage 316 is biased towards the raised position, i.e., away from the base 312. In this example, the capsule holder 132 includes a bias element such as a spring. Specifically, the illustrated embodiment includes a set of four coil springs 440 (although greater or smaller numbers of bias elements can be employed in other implementations) disposed between the carriage 316 and the base 312. In particular, the springs 440 surround corresponding posts 444, e.g., to maintain the positions of the springs 440 between the carriage 316 and the base 312. The base 312, in this example, includes apertures 448 in the shoulder 408, permitting travel of the posts 444 therein as the carriage 316 moves between the raised and lowered positions. The springs 440, meanwhile, contact the shoulder 408 around the edges of the apertures 448, compressing when the carriage 316 is lowered, and expanding back towards a resting position as the carriage 316 is raised. The springs 444, in other words, bias the carriage 316 away from the shoulder 408, towards the raised position.

Figure 5A:
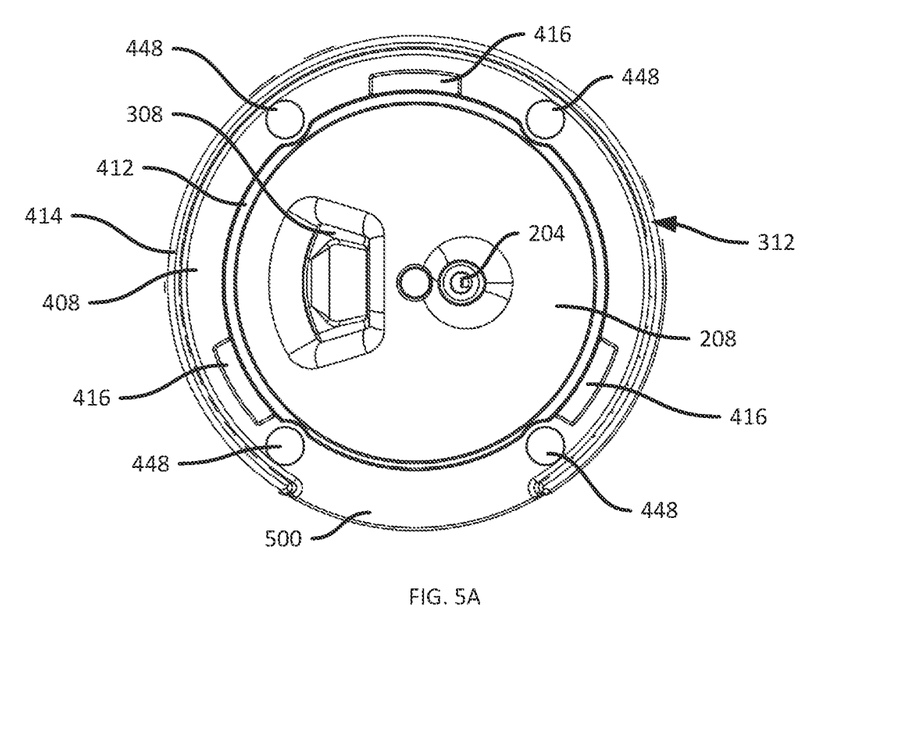
FIG. 5A is a top view of a base of the capsule holder of FIG. 4.

FIG. 5A is a top view of the base 312, showing example arrangements for the slots 416 and apertures 448. As will be apparent, a wide variety of other numbers and arrangements of slots 416 and apertures 448 can be employed. As also shown in FIG. the outer wall 414 can include a break 500 therein, to accommodate the tab 143 of the capsule 112. Similarly, the carriage 316 can include a break in the outer wall 428 (e.g., as seen in FIG. 4) to accommodate the tab 143. The two breaks mentioned above are configured to align with one another when the capsule holder 132 is assembled.

Figure 5B:
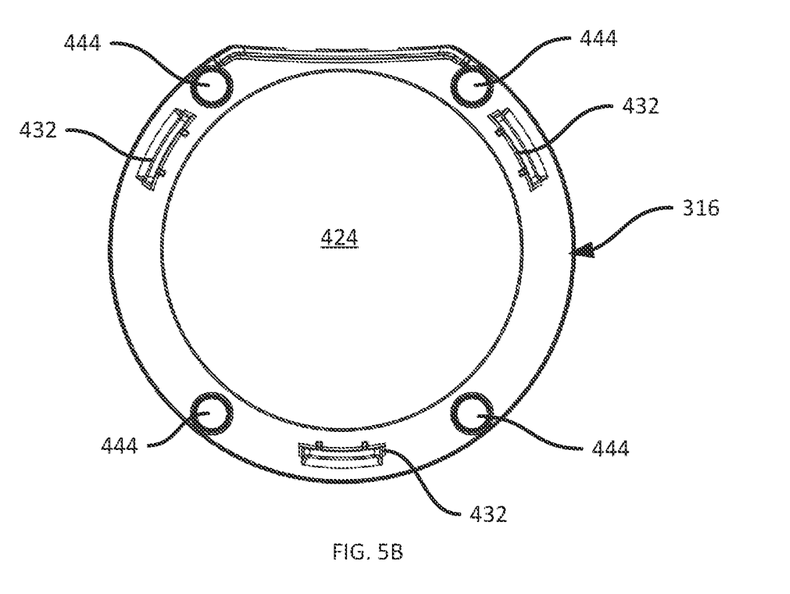
FIG. 5B is a bottom view of a carriage of the capsule holder of FIG. 4.

FIG. 5B illustrates the carriage 316 from the bottom, illustrating the positions of the tabs 432 and posts 444, which are complementary to the positions of the slots 416 and apertures 448. As will be apparent, the number and position of the tabs 432 and posts 444 can be varied along with the number and position of the slots 416 and apertures 448.

Figure 6:
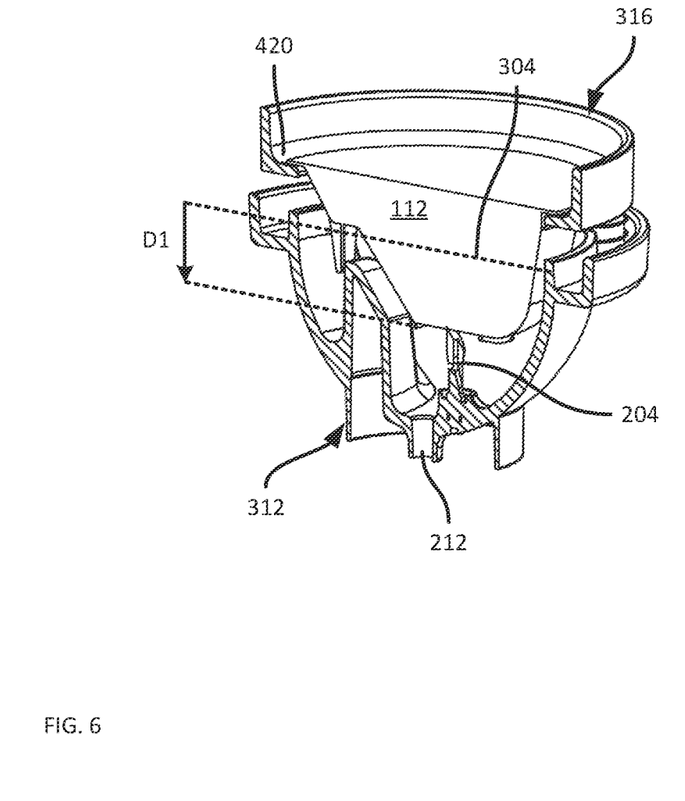
FIG. 6 illustrates the capsule holder of FIG. 4 in a raised position.

Turning to FIG. 6, the capsule holder 132 is shown in the raised position, with the capsule 112 placed therein, e.g., prior to closing the cover 124. As shown in FIG. 6, the carriage 316 is raised relative to the base 312 by the bias elements 444, such that the carriage 316 does not rest on the wall 412 of the base 312. As seen in the cross section of FIG. 6, the capsule 112 is placed at a depth D1, e.g., measured from the open end 304 of the chamber 300 to the bottom of the capsule 112. At the illustrated depth, the extractor 204 is substantially withdrawn from the capsule 112 (and, in some examples, entirely withdrawn from the capsule 112).

Figure 7:
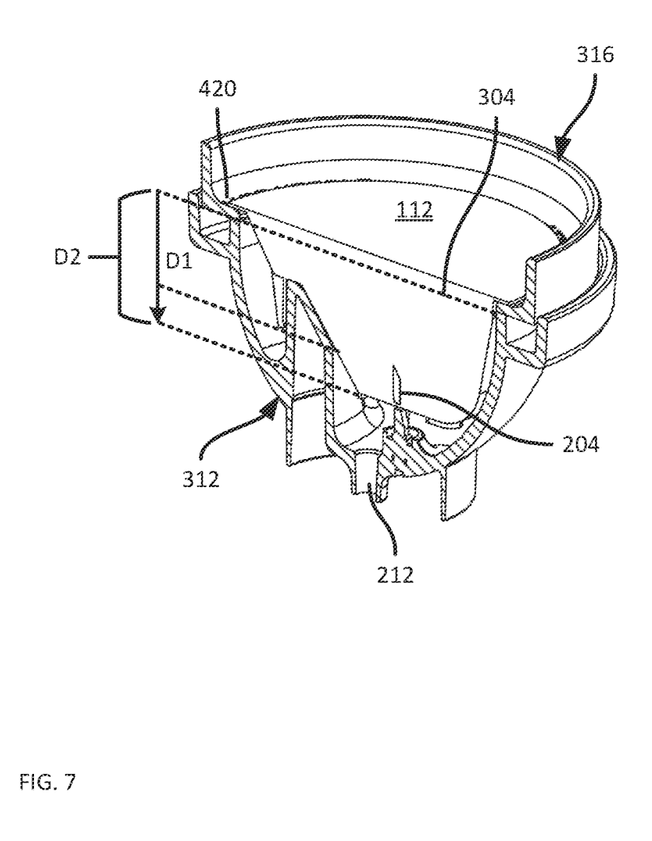
FIG. 7 illustrates the capsule holder of FIG. 4 in a lowered position.

Turning to FIG. 7, the capsule holder 132 is shown with the carriage in the lowered position, e.g., when the cover 124 is closed and therefore exerts downwards pressure on the capsule 112 sufficient to overcome the biasing effect of the springs 440. In the lowered position, the carriage 316 rests on the wall 412 of the base 312 (and the wall 412 is therefore not visible in FIG. 7). Further, the tabs 432 and posts 444 extend through the slots 416 and apertures 448 to a greater extent than in the raised position shown in FIG. 6.

As seen in the cross section provided in FIG. 7, when the carriage 316 and capsule 112 are in the lowered position, the capsule 112 is placed at a depth D2 within the chamber 300, greater than the depth D1. As a result, the capsule 112 is lowered below the uppermost extent of the extractor 204, and the extractor 204 pierces the capsule 112.

The biasing force applied by the springs 440 or other biasing elements is sufficient that, when the downwards pressure on the capsule 112 exerted by the cover 124 is removed (e.g., when the cover 124 is opened to remove the spent capsule 112), the springs 440 return the carriage 312 to the raised position, as shown in FIG. 6, As the carriage 316 returns to the raised position, the capsule 112 is also raised from the depth D2 back toward the depth D1, stripping the capsule 112 from the extractor 204 in the process. The biasing force applied by the springs 440, in other words, overcomes the frictional engagement between the extractor 204 and the capsule 112. Once the capsule 112 is returned to the position shown in FIG. 6, the capsule 112 can be removed from the apparatus 100 with little risk of inadvertently removing the capsule holder 132.

The scope of the claims should not be limited by the embodiments set forth in the above examples, but should be given the broadest interpretation consistent with the description as a whole.

The invention claimed is:

1. A capsule holder for a beverage dispensing apparatus, the capsule holder comprising:
    a base having a lower wall defining an open chamber configured to receive a beverage capsule,
        the lower wall of the base comprising a guide feature extending into the chamber and configured to engage with a corresponding recess in the capsule;
    an extractor extending from the lower wall into the chamber and configured to pierce the beverage capsule;
    a carriage having a ledge configured to engage with a perimeter flange of the capsule, the carriage movably coupled to the base between (i) a lowered position to place the capsule at a first depth in the chamber for piercing of the capsule by the extractor, and (ii) a raised position to place the capsule at a second depth smaller than the first depth, and substantially withdraw the extractor from the capsule; and
    a biasing element configured to bias the carriage toward the raised position.

2. The capsule holder of claim 1, wherein the ledge of the carriage is annular, and wherein the carriage includes an opening surrounded by the ledge, enabling passage of a body of the capsule therethrough while the flange of the capsule engages the ledge.

3. The capsule holder of claim 1, wherein the base includes a perimeter shoulder surrounding an open end of the chamber.

4. The capsule holder of claim 3, wherein the base includes a wall extending from the shoulder away from the chamber; and wherein the carriage is configured to engage with the wall in the lowered position.

5. The capsule holder of claim 3, wherein the perimeter shoulder includes a slot; and
    wherein the carriage includes a tab extending through the slot, the tab having a stop at a distal end thereof limiting a range of motion of the carriage relative to the base.

6. The capsule holder of claim 3, wherein the perimeter shoulder includes an aperture; and
    wherein the carriage includes a post configured to travel within the aperture during movement of the carriage relative to the base.

7. The capsule holder of claim 6, wherein the biasing element includes a coil spring surrounding the post and configured to engage the perimeter shoulder adjacent to the aperture.

8. The capsule holder of claim 1, wherein the extractor is integrated with the lower wall of the base.

9. The capsule holder of claim 1, wherein the lower wall includes an outlet distinct from the extractor.

10. The capsule holder of claim 1, wherein the biasing element includes a spring disposed between the base and a lower surface of the ledge.

11. The capsule holder of claim 1, wherein the base includes a flexible tab configured to engage with a housing of the dispensing apparatus, to removably retain the base in the apparatus.

* * * * *